(12) United States Patent
Kubota et al.

(10) Patent No.: US 9,672,854 B2
(45) Date of Patent: Jun. 6, 2017

(54) MAGNETIC STACK INCLUDING MGO-TI(ON) INTERLAYER

(71) Applicant: Seagate Technology LLC, Cupertino, CA (US)

(72) Inventors: Yukiko Kubota, Campbell, CA (US); Timothy J. Klemmer, Fremont, CA (US); Kai Chieh Chang, Pleasanton, CA (US); Li Gao, San Jose, CA (US); Yinfeng Ding, Fremont, CA (US); Yingguo Peng, San Ramon, CA (US); Jan-Ulrich Thiele, Sunnyvale, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 263 days.

(21) Appl. No.: 14/068,871

(22) Filed: Oct. 31, 2013

(65) Prior Publication Data

US 2015/0093598 A1    Apr. 2, 2015

Related U.S. Application Data

(60) Provisional application No. 61/884,960, filed on Sep. 30, 2013.

(51) Int. Cl.
| | | |
|---|---|---|
| G11B 5/66 | (2006.01) |
| G11B 5/65 | (2006.01) |
| G11B 5/64 | (2006.01) |
| G11B 5/851 | (2006.01) |
| G11B 5/73 | (2006.01) |

(52) U.S. Cl.
CPC ............... *G11B 5/65* (2013.01); *G11B 5/647* (2013.01); *G11B 5/66* (2013.01); *G11B 5/7325* (2013.01); *G11B 5/851* (2013.01)

(58) Field of Classification Search
None
See application file for complete search history.

(56) References Cited

U.S. PATENT DOCUMENTS

| | | | |
|---|---|---|---|
| 8,509,039 B1 | 8/2013 | Huang | |
| 2001/0036564 A1* | 11/2001 | Ohmori | G11B 5/65 428/836.1 |
| 2005/0214588 A1 | 9/2005 | Iwasaki et al. | |
| 2006/0093862 A1 | 5/2006 | Parkin | |
| 2006/0228531 A1* | 10/2006 | Iwasa | G11B 7/24038 428/195.1 |

(Continued)

FOREIGN PATENT DOCUMENTS

| | | |
|---|---|---|
| JP | H06259743 | 9/1994 |
| JP | 2000086212 | 3/2000 |

(Continued)

OTHER PUBLICATIONS

U.S. Appl. No. 13/537,379, Valaprasad et al., filed Jun. 29, 2012.

(Continued)

*Primary Examiner* — Holly Rickman
*Assistant Examiner* — Linda Chau
(74) *Attorney, Agent, or Firm* — Hollingsworth Davis, LLC

(57) ABSTRACT

A stack includes a substrate and a magnetic recording layer. Disposed between the substrate and magnetic recording layer is an MgO—Ti(ON) layer.

16 Claims, 8 Drawing Sheets

(56) References Cited

U.S. PATENT DOCUMENTS

| | | | |
|---|---|---|---|
| 2007/0026263 A1 | 2/2007 | Kubota et al. | |
| 2010/0159285 A1* | 6/2010 | Peng .................. | B82Y 10/00 428/832 |
| 2012/0194942 A1 | 8/2012 | Hohlfeld et al. | |
| 2012/0307398 A1 | 12/2012 | Kanbe et al. | |
| 2013/0016591 A1 | 1/2013 | Tomikawa | |

FOREIGN PATENT DOCUMENTS

| | | |
|---|---|---|
| JP | 2003036525 | 2/2003 |
| JP | 4069205 | 1/2008 |
| JP | 2009223940 | 10/2009 |
| JP | 2010-5598 | 1/2010 |
| JP | 4621899 | 11/2010 |
| JP | 2011-287301 | 12/2011 |
| JP | 2012048792 | 3/2012 |

OTHER PUBLICATIONS

International Search Report and Written Opinion dated Dec. 19, 2014 from PCT Application No. PCT/US2014/058021, 10 pages.

Varaprasad et al., "Electrically conductive (Mg0.2Ti0.8)) underlayer to grow FePt-based Perpendicular recording media on glass substrates", Journal of Applied Physics, 113, May 24, 2013, 5 pages.

Li et al., "Highly (001)-Textured $L1_0$ FePt-$SiO_2$-C Films with Well-Isolated Small Grains Using TiON Intermediate Layer", Applied Physics Express, Jun. 20, 2013, vol. 6, pp. 075502-1-075502-4.

Office Action dated Jun. 20, 2016, for Singaporean Application No. 201621577611166W, 4 pages.

Office Action dated Jul. 5, 2016 for Japanese Application No. 2016-510834, 4 pages.

File History for U.S. Appl. No. 14/965,579 as retrieved from the U.S. Patent and Trademark Office.

* cited by examiner

| SPUTTERING STATION 1 | | | | | | | | | |
|---|---|---|---|---|---|---|---|---|---|
| MgO-TiO | | | | | | | | | |
| STEP 1 | | | STEP 2 | | | | STEP 3 | | |
| Ar | N₂ | DUR | Ar | N₂ | POWER | DUR | Ar | N₂ | DUR |
| 24 SCCM | 16 SCCM | 2 SEC | 24 SCCM | 16 SCCM | 0.5 kW | 16 SEC | 5 SCCM | 0 SCCM | 1 SEC |

| SPUTTERING STATION 2 | | | | | | | | | |
|---|---|---|---|---|---|---|---|---|---|
| MgO-TiO | | | | | | | | | |
| STEP 1 | | | STEP 2 | | | | STEP 3 | | |
| Ar | N₂ | DUR | Ar | N₂ | POWER | DUR | Ar | N₂ | DUR |
| 150 SCCM | 10 SCCM | 1 SEC | 150 SCCM | 10 SCCM | 0.6 kW | 8.5 SEC | 5 SCCM | 0 SCCM | 1 SEC |

MAGNETIC STACK INCLUDING MGO-TI(ON) INTERLAYER

RELATED APPLICATIONS

This application claims the benefit of Provisional Patent Application Ser. No. 61/884,960 filed on Sep. 30, 2013, to which priority is claimed pursuant to 35 U.S.C. §119(e) and which is hereby incorporated herein by reference in its entirety.

SUMMARY

Embodiments discussed herein involve a magnetic stack that includes a substrate, a magnetic recording layer, and a MgO—Ti(ON) layer disposed between the substrate and the magnetic recording layer.

Certain embodiments involve a stack that includes a substrate, a magnetic recording layer, a heatsink layer disposed between the substrate and the magnetic recording layer, and a MgO—Ti(ON) layer disposed between the heatsink layer and the magnetic recording layer.

Embodiments are also directed to methods including depositing MgO and TiO using a composite sputtering target in a nitrogen environment to form a MgO—Ti(ON) layer. An FePt magnetic layer is then epitaxially grown on the MgO—Ti(ON) layer.

Further embodiments are directed to an apparatus including a sputtering target comprising MgO and TiO configured to deposit a MgO—Ti(ON) layer in a nitrogen sputtering environment.

These and other features and aspects of various embodiments may be understood in view of the following detailed discussion and accompanying drawings.

DETAILED DESCRIPTION

Figure 1A:
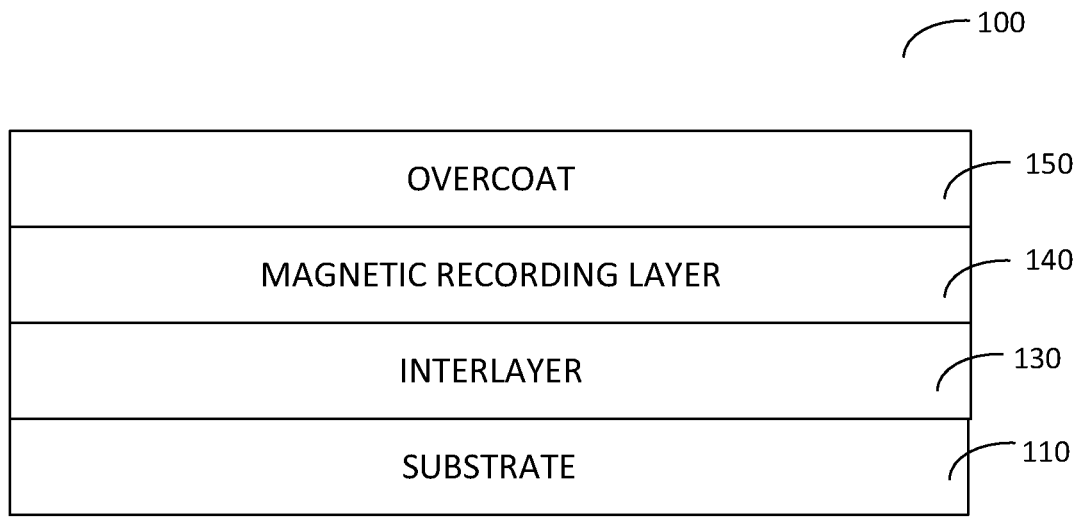
FIGS. 1A and 1B are cross sectional diagrams of magnetic stacks that include MgO—Ti(ON) interlayers, according to some embodiments.

Heat assisted magnetic recording (HAMR) has the ability to extend the areal density of magnetic recording due to the high magnetocrystalline anisotropy of the materials used in the recording layer. In order to form the HAMR media, one or more sublayers can be used to orient and/or control the grain size of the high anisotropy magnetic recording layer. For example, for recording layers comprising FePt, these sublayers can be used to induce the $L1_0$ (001) texture of the FePt film. The microstructures of FePt (or other magnetic layers) depend on sublayers immediately below which play a role in controlling the microstructures of the magnetic layer such as c-axis dispersion and grain size. For example, the sublayers may provide one or more of the following properties: 1) suitable lattice structure for magnetic layer epitaxial growth; 2) chemical stability and diffusion barrier; 3) thermal resistance and/or conductance suitable for rapid thermal transport of heat from the magnetic layer(s) to heatsink layers; and (4) control of the laser power required to heat the magnetic layer(s) to the required recording temperature.

HAMR media are commercially mass produced. In addition to satisfying performance properties mentioned above, HAMR media must withstand a mass-production environment. One example of a mass-production technique is direct current (DC)-sputtering. DC sputtering differs from other sputtering techniques (e.g., radio frequency (RF)-sputtering) in the voltage, system pressure, sputter deposition pattern, type of target material, deposition speeds, and low defect levels. Conventional ceramic MgO interlayers cannot be DC-sputtered. While a pulsed DC sputtering can be used with a metallic magnesium target in a mixed oxygen and argon gas environment, this tends to result in high particle generation. Sublayer materials developed and tested in a research lab environment may satisfy performance properties; however, these materials do not necessarily scale up to withstand commercial, mass production techniques. For example, sublayers comprising MgO—TiO have been suggested for use as an interlayer. But when deposited with DC-sputtering techniques, these MgO—TiO interlayers achieved insufficient magnetics compared to a conventional MgO interlayer, or resulted in high particle generation when the MgO—TiO target compositions shifted toward higher MgO content. Thus, promising performance test results for media produced in a lab environment cannot be relied upon for media produced in a commercial environment.

Embodiments discussed herein involve the use of an MgO—Ti(ON) layer (hereinafter "MTON layer") arranged in a magnetic stack between the substrate and the magnetic recording layer. The MTON layer may provide at least some of the properties set forth above for the magnetic recording layer. In addition to promoting the orientation of the magnetic layer epitaxial growth (e.g., FePt (001) epitaxial growth), the MTON layer can support granular two-phase growth of the magnetic recording layer. Furthermore, the MTON layer may also provide a specified amount of thermal resistivity and/or conductivity in the stack while being produced by DC-sputtering with high deposition speed and low resulting defect level.

FIG. 1A illustrates a magnetic stack 100 that includes an MTON interlayer 130. The MTON layer 130 underlies a magnetic recording layer 140 in the stack 100. As shown in FIG. 1A, the MTON layer 130 is disposed, e.g., deposited, between the substrate 110 and the magnetic recording layer 140. A protective overcoat or lubricant layer 150 may be disposed on the magnetic recording layer 140. The magnetic recording layer 140 is a granular two-phase layer. The first phase of the magnetic recording layer 140 comprises magnetic grains and the second phase comprises non-magnetic segregant disposed between the grain boundaries of the magnetic grains. The non-magnetic segregant may comprise one or more of C, $SiO_2$, $Al_2O_3$, $Si_3N_4$, BN, or another alternative oxide, nitride, boride, or carbide material. Suitable materials for the magnetic grains include, for example FePt, FeXPt alloy, FeXPd alloy, CoPt, CoXPt where X is a dopant. Although any of these materials in various combinations may be used for the magnetic layer 140, the examples provided herein focus on FePt as the magnetic recording layer material. In some configurations, the magnetic recording layer comprises magnetic crystalline grains of FePt and a non-magnetic segregant comprising $SiO_x$ and C disposed between the crystalline grains. The magnetic layer may comprise $SiO_x$ in an amount between about 35 and about 45 vol. % and C in an amount of about 20 vol. %.

The interlayer 130 comprises a combination of MgO and Ti(ON)—an MTON layer. The composition of MgO has a ratio of Mg:O=1:1 such that MgO is a line compound, and the composition of Ti:(ON) is approximately 1:1. The composition of (ON) in the Ti(ON) is $(O_yN_{1-y})$ where y is preferably 0.5<y<1, resulting in oxygen rich Ti(ON). Thus, the MTON layer can be described as $(MgO)_x(Ti_{0.5}(O_y N_{(1-y)})_{0.5})_{1-x}$. While the ratio of MgO to Ti(ON) can vary, the MTON layer can have 20-25 vol. % MgO, and preferably at most 20 vol. % MgO. Thus, the MTON layer can be described as $(MgO)_x(Ti(ON))_{1-x}$. The amount of MgO can be determined by the method of deposition of the MTON layer, as discussed further below.

The MTON layer 130 is a continuous layer having a thickness from 1 to 500 angstroms. Each component of the MTON layer 130, MgO, TiO, and TiN has NaCl-type crystal structure with similar, or almost the same, lattice parameters. Their respective phase diagram data indicates, for example, MgO can have cell parameters of approximately 0.42121 nm; TiO can have cell parameters of approximately 0.4177; and TiN can have cell parameters of approximately 0.4239 nm. The high temperature phase of titanium-monoxide (TiO) takes a NaCl-type crystal structure, and Ti:O atomic ratio ranges from $TiO_{0.7}$ to $TiO_{1.25}$ with significant amount of vacancies in the lattice. Addition of nitrogen into those vacancies can stabilize the NaCl-type lattice even at room temperature, at which pure TiO loses its NaCl ordering. The stabilized NaCl-type crystal phase also serves as a growth orientation template, or seedlayer, for the magnetic recording layer, similar to MgO and TiN.

Figure 1B:
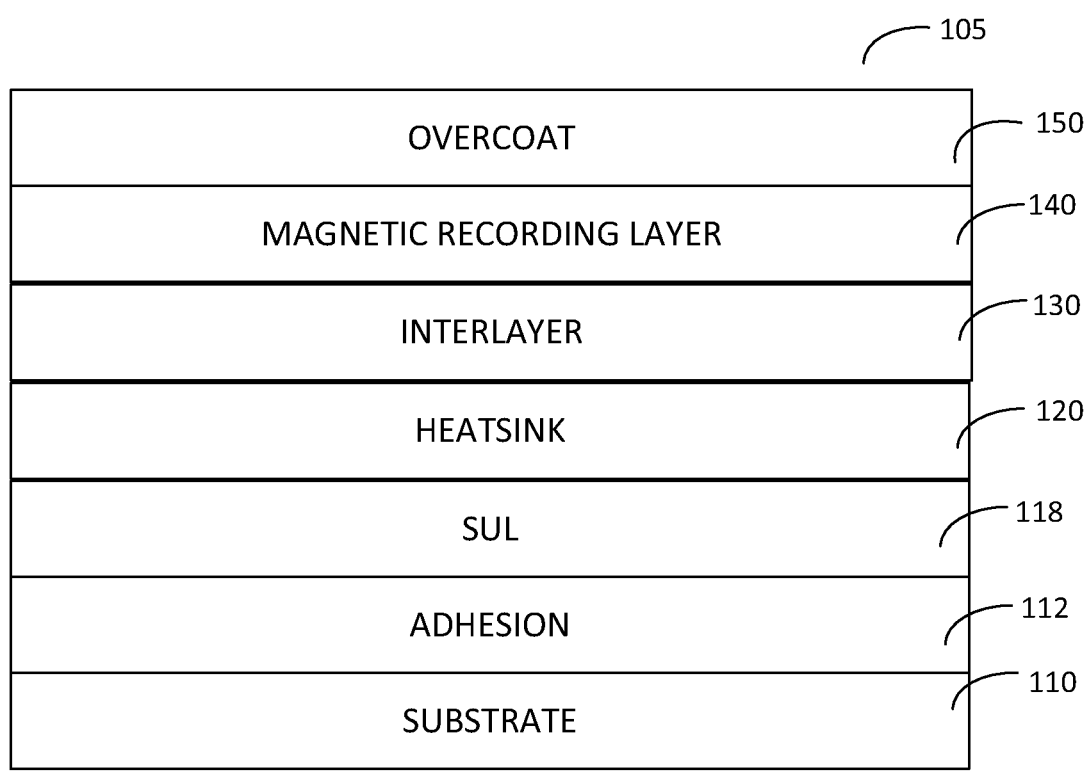

In some embodiments, a magnetic stack 105 may include a MTON interlayer 130 in conjunction with further underlayers as illustrated in FIG. 1B. FIG. 1B illustrates a stack that is similar in many respect to the stack of FIG. 1A, having a substrate 110, interlayer 130, magnetic recording layer 140, and overcoat 150. These layers 110, 130, 140, 150 may have characteristics and materials similar to layers with the same reference numbers described in connection with FIG. 1A. FIG. 1B shows a heatsink layer 120 as part of the stack underlayer. Heatsink layers, such as layer 120 are used in HAMR media to facilitate thermal management since the heating of HAMR media has to be powerful enough to reach desired temperatures (at least close to the Curie point), but the cooling rate has to be fast enough to avoid thermal destabilization of the written information during the time the media cools down. Both of these issues, efficiency of the heat delivery system and fast cooling rate, are mutually competitive—the faster the cooling rate the more heating power is required to achieve a certain temperature increase.

In some configurations, heatsink layer 120 may comprise (200) Cu, Mo, W, or their alloys such as CuX.

Copper (Cu) and/or CuX (e.g., CuX, where X can be any soluble element(s) less than about 50 molecular percent), provides sufficiently high thermal conductivity to be useful for a HAMR heat sink layer. However, layers of Cu and CuX tend to grow in (111) orientation. Magnetic stacks that include (111) heatsink layers may employ one or more additional layers disposed on the heatsink layer that provides or resets the growth orientation for subsequent layers in the magnetic stack, e.g., the magnetic recording layer, which are grown over the heatsink layer in (200) orientation for $L1_0$ phases. Having (200) and (111) mixed oriented grains in the Cu based heatsink will induce a significant surface roughness in the film stack, which is not preferred in a magnetic recording media application.

For surface energy considerations, body-centered-cubic (BCC) structured heatsink materials, such as Mo and W, preferably have (110) orientations instead of (200). Similar to Cu based heatsinks, magnetic stacks that include (200) heatsink layers may employ one or more additional layers deposited on the heatsink layer to provide, or reset, the growth orientation for subsequent layers in the magnetic stack. Mixed oriented grains of (200) and (110) contribute to high media roughness, which is preferably avoided in magnetic recording media applications.

The MTON interlayer 130 in combination with heatsink layer 120 provides suitable thermal conductivity, e.g., in a range of about 80 W/m-K to about 400 W/m-K, and additionally provides an orientation template that produces a magnetic recording layer having a lower roughness when compared to magnetic recording layers grown on non-(200) oriented heatsink layers.

In addition to the heatsink layer 120, the stack 105 can include seed and/or adhesion 112 layers disposed between the substrate 110 and the heatsink layer 120. For example, an adhesion layer 112, e.g. a tantalum layer, having a thickness of about 3.5 nm, may be disposed on the substrate to promote adhesion between the substrate and an adjacent layer. The adhesion layer 112 is used to reduce the potential for delamination of the substrate from the rest of the stack. The stack may include a seed layer disposed over the adhesion layer 112, where the seed layer initiates appropriate growth orientation for the layers above.

The stack 105 can also include a soft magnetic underlayer (SUL) 118 arranged to function as a return path for magnetic flux produced by the magnetic write field during a write operation. The SUL 118 is disposed between the substrate 110 (and seed/adhesion layers, if present) and the heatsink layer 120. The SUL 118 may comprise amorphous and/or crystalline materials may have a thickness of from about 5 nm to about 500 nm, or even 1,000 nm. For example, the SUL 118 may be made of any suitable material such as CoFe, FeCoB, FeAlN, FeAlSi, NiFe, CoZrNb, or FeTaN. The SUL 118 may also comprise laminated structures and/or may comprise antiferromagnetically coupled (AFC) SUL layers.

Figure 2:
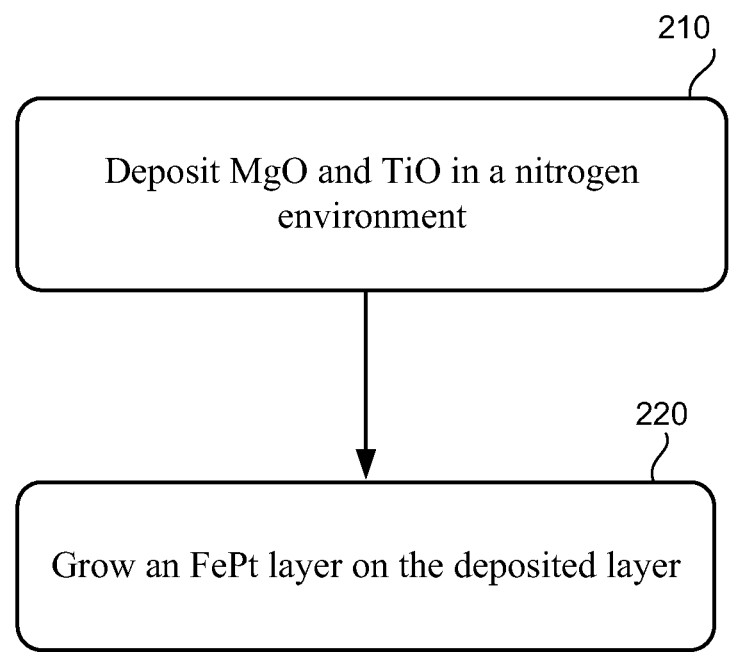
FIG. 2 is a flow diagram illustrating a process for forming an MgO—Ti(ON) interlayer, according to some embodiments.

A magnetic stack comprising at least a MTON interlayer and a magnetic recording layer is produced as disclosed in the flow chart of FIG. 2. Prior to forming the MTON layer, a substrate is processed and optional underlayers are applied such as an adhesion layer, a soft magnetic underlayer, and/or one or more heatsink layers. These are fabricated using standard techniques known in the art and are not discussed further. To form the MTON layer, MgO and TiO are sputter deposited in a nitrogen environment 210.

According to embodiments described herein, the MTON layer is deposited by DC-sputtering a composite target comprising MgO and TiO using magnetron sputtering at elevated temperature (400° C. or above). While various sputtering techniques may also be used, DC-sputtering is preferred due to the higher deposition rates (throughput rates) achievable as compared with, e.g., RF-sputtering. DC-sputtering also results in lower chamber contamination. For the disclosed embodiments, RF-sputtering is not required. The amount of MgO in the composite target can be determined by the sputtering technique. For example, for DC and/or pulsed DC-sputtering, the composite target includes at most 20-25 vol. % MgO. The DC-sputtering occurs in a nitrogen environment such that the sputtering gas includes both an inert gas such as argon as well as nitrogen. The amount of nitrogen is varied via the flow rate, as discussed further below.

Since MgO, TiO, and TiN each have NaCl-type crystal structure, with comparable cell parameters, the resulting MTON layer maintains the NaCl-type crystal structure. This crystal structure enables growth of a magnetic recording layer on the stack 220. An FePt (001) epitaxially grown layer is fabricated on the deposited MTON layer. The FePt is a magnetic recording layer that can be directly grown on the MTON layer or additional interlayers may intervene. The stack can include further layers, such as a multi-layer magnetic recording layer and protective overcoat layers.

As discussed above, the MTON interlayer is fabricated in a nitrogen environment resulting in the interlayer including nitrogen in the form of Ti(ON). Previous interlayers did not include nitrogen and instead consisted of MgO—TiO. However, these previous interlayers did not achieve the necessary magnetics when DC-sputter deposited. The vacancy containing TiO tends to disassociate into metallic Ti and higher ordered Ti-oxides such as $TiO_2$ and $Ti_2O_3$ upon media fabrication. Diffusion of metallic Ti into the FePt recording layer degrades the magnetic performance as compared with media containing a ceramic MgO interlayer. Additional impurities of higher ordered Ti-oxides, such as $TiO_2$ and $Ti_2O_3$, contribute to the defect generation as particles. Presence of insulating impurities inside a composite MgO—TiO target, and also, presence of oxygen inside the sputtering gas environment, further increases particle generation during the deposition process. Thus, media containing the previous interlayers fabricated with DC-sputtering were insufficient.

The nitrogen reactive sputtering of the disclosed embodiments stabilizes the crystal phase of the deposited layer by adding TiN to form an interlayer comprised of MgO—TiO—TiN. While a layer comprising MgO—TiN can be fabricated, the MgO content necessary exceeds 50 vol. % such that the film fabrication requires RF-sputtering. Thus, oxygen in the form Ti(ON) enables sputtering in DC.

Figure 3A:
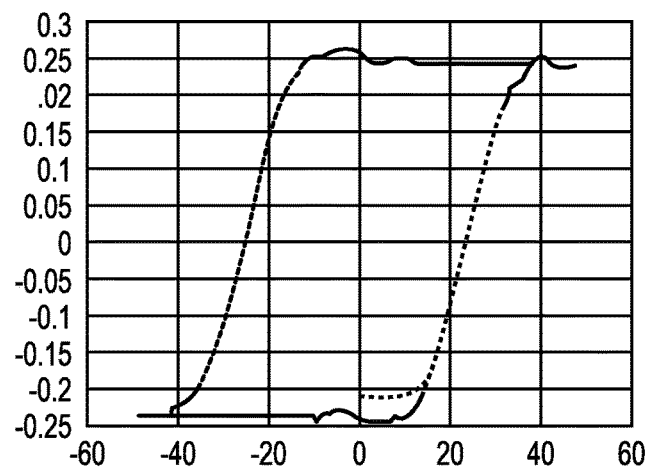
FIGS. 3A-C show the M-H loops of interlayers with and without nitrogen.
Figure 3B:
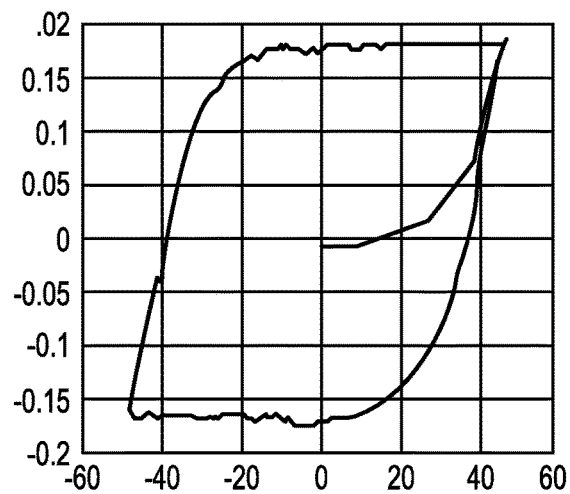
Figure 3C:
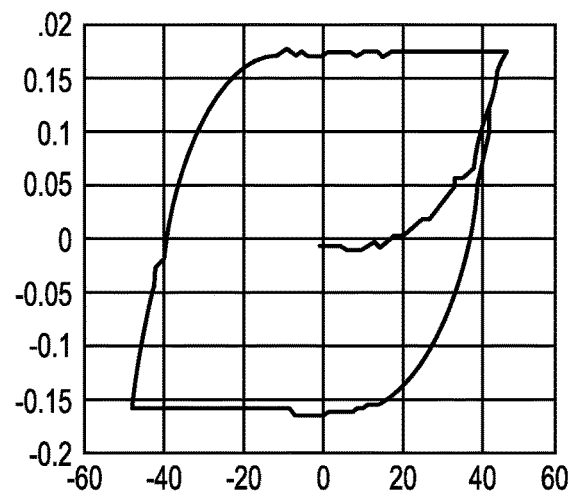

FIGS. 3A-3C illustrate the change in magnetics as a result of adding nitrogen to the interlayer, with a ratio of MgO:TiO=1:1 in the composite target. First, FIG. 3A illustrates an M-H hysteresis loop for a medium having an interlayer DC-sputtered in an argon-only environment. The medium of FIG. 3A had a measured coercivity of about 24.6 kOe. FIG. 3B, however, illustrates the M-H hysteresis loop for a medium fabricated under approximately the same conditions, with an exception being that the sputtering environment for the interlayer included nitrogen at a flow rate of 2 standard cubic centimeters per minute (sccm). The addition of nitrogen improved the FePt texture, as illustrated by the improved width of the hard access opening of the M-H loop of FIG. 3B. The medium of FIG. 3B had a measured coercivity of about 38.6 kOe. The M-H loop of FIG. 3C is similar to that of FIG. 3B since the medium was fabricated under similar conditions with the exception being an increased flow rate of nitrogen to 4 sccm during deposition of the interlayer. The coercivity of the medium of FIG. 3C was measured to also be slightly higher at 38.9 kOe.

Figure 4:
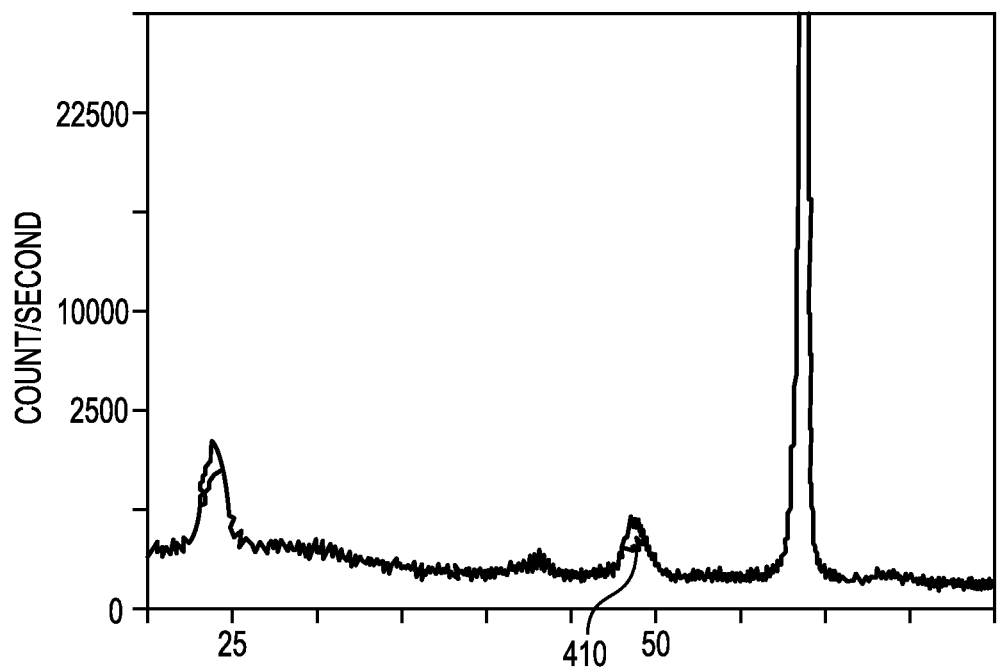
FIG. 4 shows an X-ray diffraction graph of interlayers with varying amounts of nitrogen.

The improvement in magnetics and FePt texture can also be detected in the X-ray diffraction graph of FIG. 4. FIG. 4 is a conventional theta-2theta scan in the 20-70 degree range with a vertical axis of count/sec for samples with varying amounts of nitrogen in the respective interlayers. The FePt 001 and 002 peak intensities at 24 degrees and at 48 degrees change with the amount of nitrogen in the sample's interlayer. The results for the sample containing no nitrogen in the interlayer are identified by reference numeral 410. The 001 FePt signal is significantly weaker when compared with the samples containing nitrogen. The nitrogen in Ti(ON) serves to stabilize the NaCl phase even under the high speed/power density DC-sputtering conditions used to fabricate perpendicular magnetic recording media. The degree of nitridation for the deposited interlayer is controlled by varying the $Ar:N_2$ gas ratio in the sputtering environment. Alternatively, a desired nitrogen interlayer composition could be controlled with MgO—Ti(ON) sputtering targets. For example, the composition could be optimized based on the raw Ti:O ratio in TiO. In order to add nitrogen to the interlayer composition, varying ratios of nitrogen to argon in the sputtering environment were tested.

Figure 5:
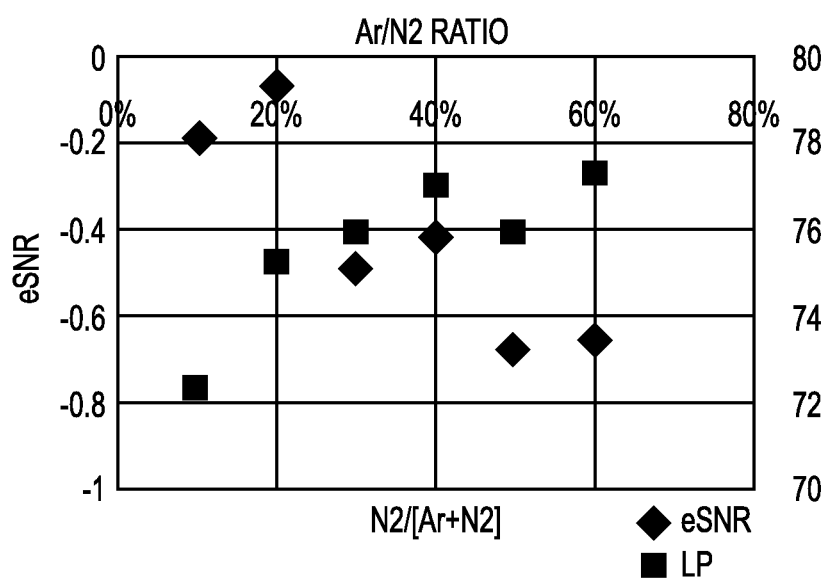
FIG. 5 shows the signal-to-noise ratio and corresponding laser power reduction for media with varying amounts of nitrogen in an MgO—Ti(ON) interlayer.

FIG. 5 illustrates both the signal to noise ratio (eSNR) and reduction in laser power (LP) for media samples with interlayers deposited with varying amounts of nitrogen in the sputtering environment. Each medium (disk) is evaluated with respect to reference media, which is represented by the zero point on the left y-axis. The closer the disk tests to the reference media (more positive numbers), the results represent improved eSNR.

Also shown on the right y-axis, is the reduction in laser power to attain optimum eSNR. For example, reference media is represented by 100% laser power so a measurement of 75% LP means that laser power can be reduced by 25% to achieve optimum eSNR for a sample disk. FIG. 5 illustrates that eSNR stays close or slightly above the reference media for nitrogen added interlayers (MTON interlayers) with approximately 25% reduction in laser power. In HAMR recording, laser power reduction during a writing operation indicates the presence of a thermal resistor, which limits the heat flow into the film layers of the recording medium. Reduced laser power is a preferred factor in improving the reliability of HAMR heads—generally lower laser power will prolong the operational life of a HAMR head.

Figure 6:
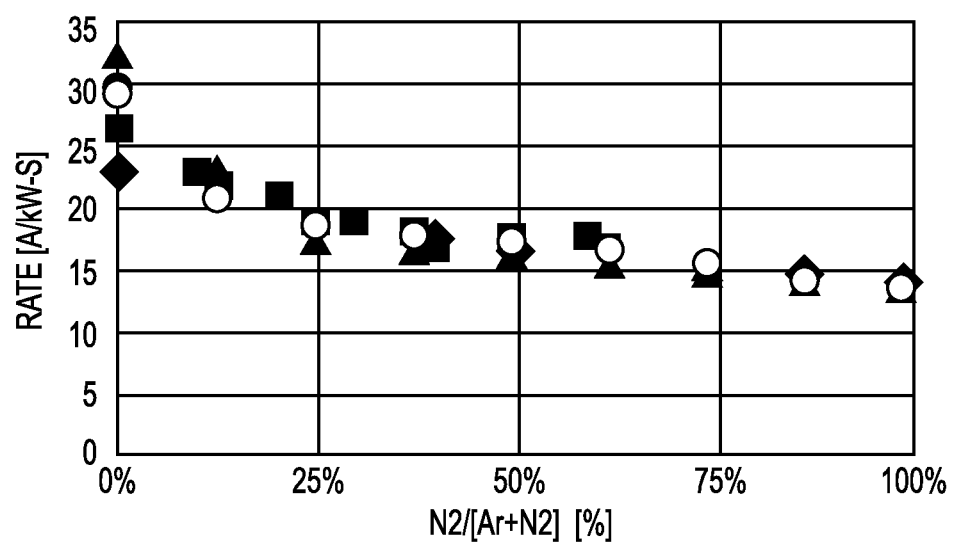
FIG. 6 shows the change in deposition rate of an MgO—Ti(ON) layer based on the amount of nitrogen in the sputtering gas.

The introduction of nitrogen into the sputtering environment also reduces the deposition rate of the MTON interlayer. FIG. 6 illustrates the interlayer film growth rate for media samples with interlayers deposited with varying amounts of nitrogen in the sputtering environment. As can be seen, the deposition rate changes in a predictable manner with increasing amounts of nitrogen in the sputtering environment regardless of the target composition. For example, targets with ratios such as MgO:TiO=40:60, 50:50, and 20:80 (different target compositions are represented by differently shaped data points) both experience decreases in film growth rate with nitridation. In contrast, without nitrogen the film deposition rates for the same targets vary unpredictably. In addition, the change in the deposition speed up to about 20% nitrogen in the sputtering gas changes the degree of nitridation in Ti(ON) in the interlayer. However, highly oxidized phases like $TiO_2$ and $Ti_2O_3$ should not be present in the interlayer TiO. The highly oxidized phases are insulating and create additional particle sources in the sputtering process resulting in additional defects in the media.

Figures 7A, 7B, 7C:
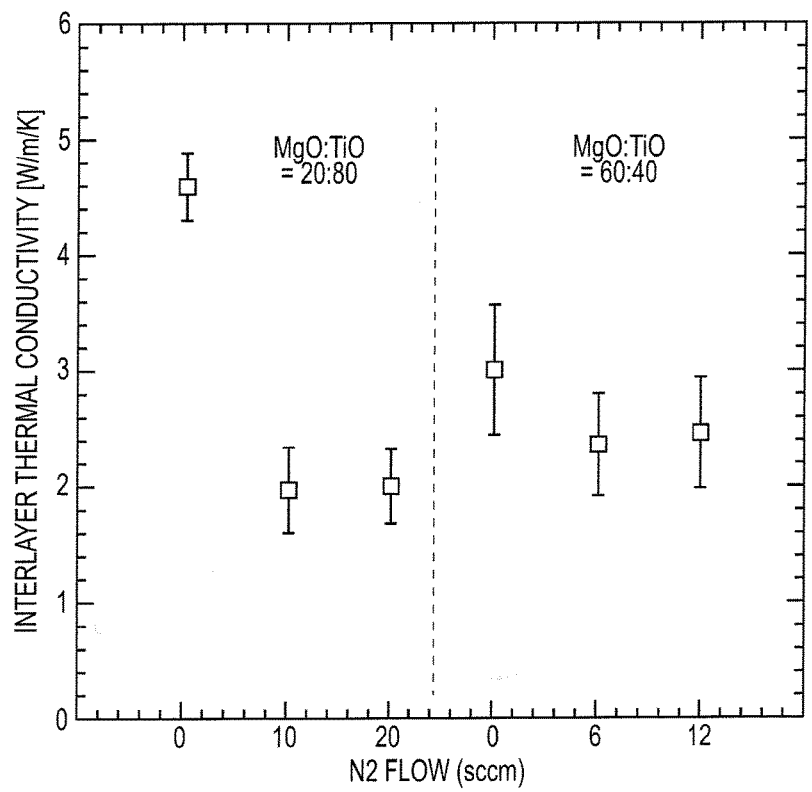
FIG. 7A shows the change in thermal conductivity based on varying target compositions and nitrogen flow rates.
FIGS. 7B-C are diagrams illustrating processes that can be used to produce an MgO—Ti(ON) layer according to some embodiments.

Changing the nitrogen flow rate can also influence the thermal conductivity of an MTON interlayer. FIG. 7A presents the thermal conductivity change of the interlayer with two different MgO:TiO target ratios and varying nitrogen gas flows during reactive sputtering. The layer conducts heat laterally in the layer as well as vertically, away from the magnetic recording layer. In the interlayers with higher TiO composition, the left side of the figure, the change in thermal conductivity with and without nitrogen is over 50%. Thus, the thermal flow in a HAMR media stack can be tuned through selection of the MgO:TiO ratios in the sputtering target and through the amount of nitrogen in Ti(ON). Both factors are controlled during fabrication of the MTON interlayer in a DC-sputtering process.

The DC-sputtering process is described further with respect to FIGS. 7B-C. The two primary variables in depositing an MTON interlayer are the composition of the MgO—TiO target and the amount of nitrogen in the sputtering gas. With respect to the composition of the target, the ratio of MgO to TiO can vary. Different example ratios are 20:80, 40:60, and 50:50. However, for MTON layers as disclosed herein, it is preferred that the composition of the target comprise at most 20 vol. % MgO. Since TiO has a composition range providing NaCl-type crystal structure, the Ti:O ratio can vary. The Ti:O composition can vary due to the raw TiO material and/or the target fabrication process. Table 1 illustrates the properties of sample targets with varying MgO:TiO composition ratios.

TABLE 1

| Material Comp. | | MgO | 70:30 | 60:40 | 50:50 | 30:70 | TiO |
|---|---|---|---|---|---|---|---|
| Resistivity | mΩcm | ∞ | 1.8 | 0.72 | 0.52 | 0.4 | 0.31 |
| Thermal Conductivity | W/m/K | 59 | 39 | 34 | 24 | 13 | 8.3 |
| Sputter rate | nm/min | 0.6 | 1.9 | 1.9 | 1.9 | 2.1 | 2.4 |
| Crystal Structure | | NaCl | NaCl | NaCl | NaCl | NaCl + TiO | TiO |

Based on the above properties, DC-sputtering can be used with each of the targets, except that of the left-most column. MgO cannot be DC-sputtered alone. While it is possible to use the targets with a higher MgO content (example 70% and 60%) with a DC-sputtering technique, it is not preferred.

With respect to the amount of nitrogen in the sputtering gas, as discussed above, the amount is controlled by varying the flow rate of nitrogen during DC-sputtering. FIG. 7B illustrates an approach to growing the MTON layer that includes sputtering MgO—TiO in the presence of $N_2$ to achieve the MTON interlayer in accordance with some embodiments. In step 1, argon at 24 standard cubic centimeters per minute (sccm) and $N_2$ at 16 sccm flow into the sputtering station for 2 seconds prior to commencement of sputtering. In step 2, MgO—TiO is DC sputtered for 16 seconds at 0.5 kW. Note that although DC sputtering is used in the examples discussed herein, AC or RF sputtering are also suitable for deposition of the MTON layer. During step 2, both of the argon and $N_2$ flows are kept the same as in step 1. In step 3, the argon flow rate is reduced to 5 sccm and the $N_2$ flow is turned off. The approach of FIG. 7B provides an interlayer that includes MgO—TiO—TiN, e.g., $(MgO)_x(Ti_{0.5}(O_yN_{(1-y)})_{0.5})_{1-x}$. The amount of oxygen in the deposited layer influences the wetting, and resulting orientation control, of the subsequent FePt layer. Also, the addition of nitrogen to the deposited layer provides for finer grains in the subsequent FePt layer, as compared with an interlayer without nitrogen. Varying the flow rates and target compositions provides for a comparison of sample media with an MTON interlayer with desirable magnetics. For example, a medium with a positive deviation in SNR and a laser power reduction of approximately 25% satisfies certain requirements for HAMR recording.

FIG. 7C illustrates another approach to growing the MTON layer that includes sputtering MgO—TiO in the presence of $N_2$ to achieve the MTON interlayer in accordance with some embodiments. In step 1, argon at 150 sccm and $N_2$ at 10 sccm flow into the sputtering station for 1 second prior to commencement of sputtering. In step 2, MgO—TiO is DC sputtered for 8.5 seconds at 0.6 kW. Note that although DC sputtering is used in the examples discussed herein, AC or RF sputtering are also suitable for deposition of the MTON layer. During step 2, both of the argon and $N_2$ flows are kept the same as in step 1. In step 3, the argon flow rate is reduced to 5 sccm and the $N_2$ flow is turned off. The approach of FIG. 7C provides an interlayer that includes MgO—TiO—TiN, e.g., $(MgO)_x(Ti_{0.5}(O_yN_{(1-y)})_{0.5})_{1-x}$.

Figure 8A:
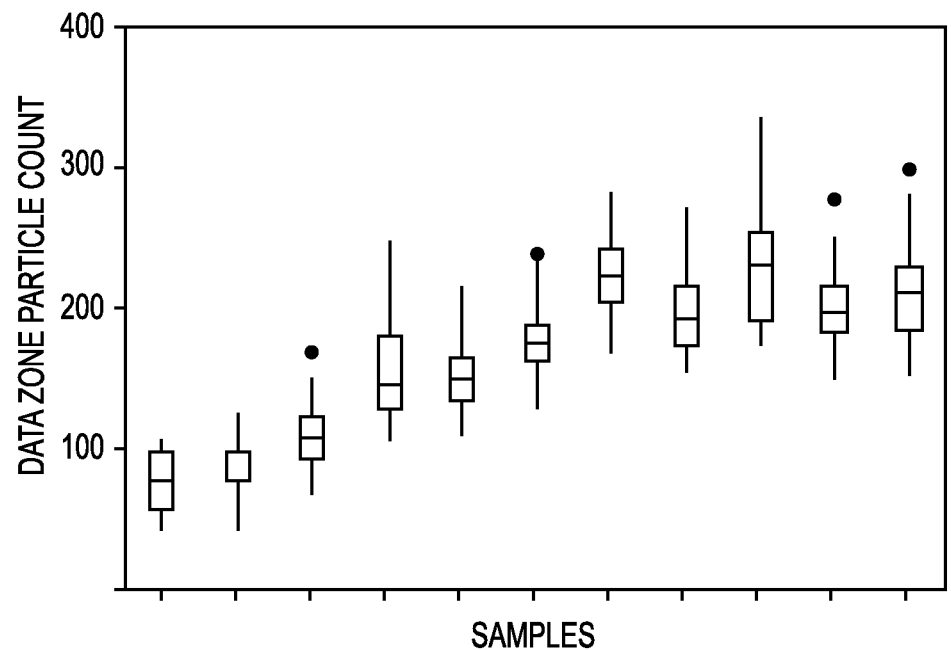
FIG. 8A shows relative amounts of defects in sample media with an MgO interlayer.
Figure 8B:
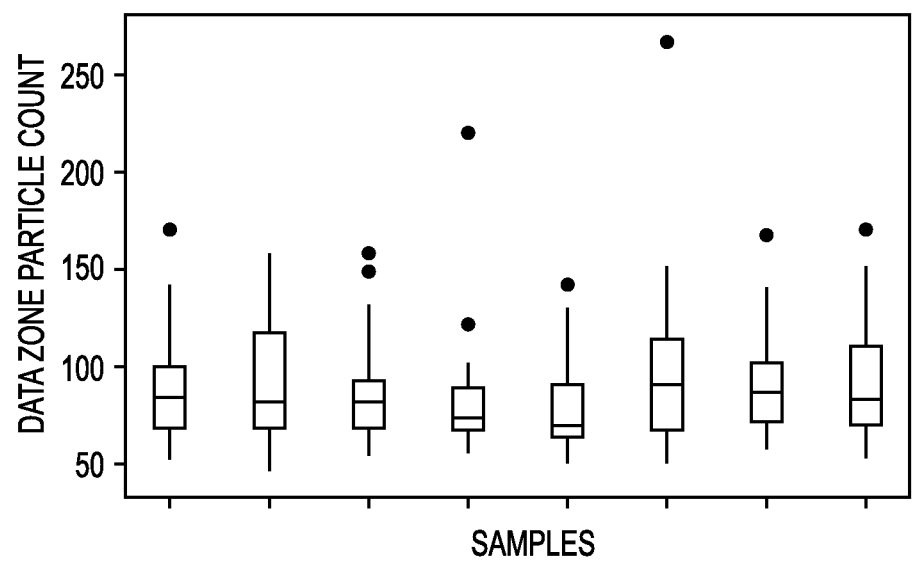
FIG. 8B shows relative amounts of defects in sample media with an MgO—Ti(ON) interlayer.

In addition to depositing the desired layer(s), sputtering processes generate extraneous particles. These particles result in defects in fabricated recording media. As fabrication processes improve, these defects are being reduced, e.g., from the 10,000's to less than 100. Historically, the majority of the particles (90+%) analyzed in sample media resulted from the sputtering of a conventional MgO interlayer. FIG. 8A illustrates the number of particles (~100-200) in media samples having a pulsed DC conventional MgO interlayer. Improvements in sputtering processes have included target and shield improvements, fabrication in smaller batches (e.g., 100 disks at a time), and improved stability with process control. However, the pulsed DC technique still yields approximately 150 particles per data zone. In contrast, FIG. 8B illustrates the number of particles in media samples with a DC-sputtered MTON layer. Using perpendicular magnetic recording-like source and shield configurations, the MTON layered samples yielded fewer defects (e.g., <100 particles). Moreover, the majority of particles analyzed resulted from the composite FePT targets with only a few particles resulting from deposition of the MTON layer.

Figure 9A:
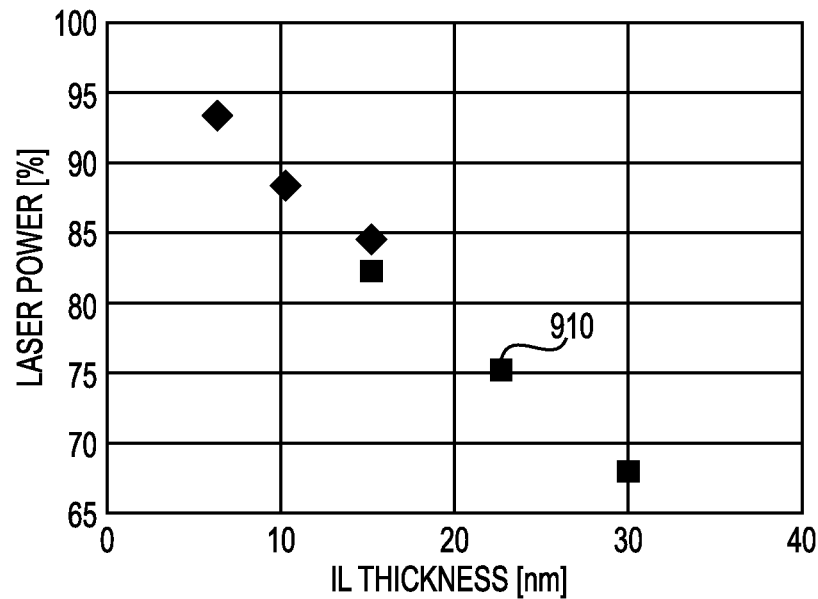
FIG. 9A shows laser power reduction for media with varying MgO—Ti(ON) interlayer thicknesses.
Figure 9B:
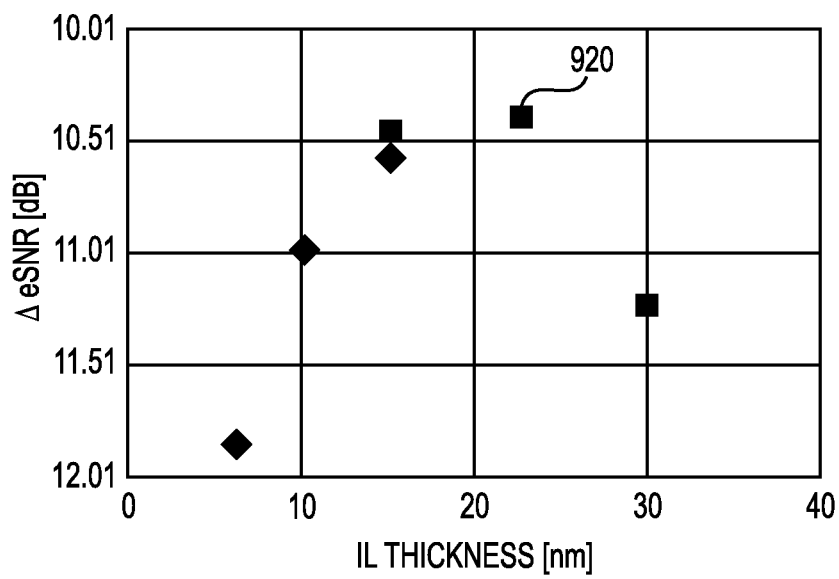
FIG. 9B shows signal-to-noise ratios for media with varying MgO—Ti(ON) interlayer thicknesses.

In addition to a reduction in particles, the DC-sputtered MTON layer has a thickness dependence on laser power and SNR. FIGS. 9A and 9B illustrate these respective relationships. For example, FIG. 9A illustrates that as the thickness of the MTON interlayer increases, the laser power is further reduced. Thus, the thickness of the MTON layer influences the thermal conductivity of a recording medium. FIG. 9B shows that SNR improves with increasing thickness, at least up to a certain point. Corresponding data points 910 and 920 indicate a preferred combination of improved SNR with reduced laser power at a thickness of about 22 nm. Conventional MgO interlayers exhibited little thickness dependence on these properties; therefore, such media included at least a second heatsink layer. With the thickness dependence exhibited by MTON interlayers in the described embodiments, such a heatsink layer may not be necessary.

As discussed above, the reduction in laser power exhibited by the MTON layer indicates that the MTON layer is a thermal resistor. As opposed to ceramic MgO interlayers, the required laser power for recording varies with the MTON thickness. The presence of the MgO/heatsink interface determined the laser power in the MgO interlayer instead of the MgO thickness. Therefore, the MTON interlayer exhibits a bulk resistance instead of an interfacial resistance as found with ceramic MgO interlayers. The MTON layer works to both determine the orientation of the FePt layer (e.g., as a seedlayer) and to confine heat as a second heatsink layer. The MTON layer can be tuned based on the composition and/or thickness of the layer.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A stack, comprising:
   a substrate;
   a magnetic recording layer; and
   a non-magnetic MgO—Ti(ON) layer disposed between the substrate and the magnetic recording layer wherein the MgO—Ti(ON) layer comprises $(MgO)_x(Ti_{0.5}(O_yN_{(1-y)})_{0.5})_{1-x}$ and at most 20 vol. % MgO.

2. The stack of claim 1, wherein the MgO—Ti(ON) layer has NaCl-type crystal structure.

3. The stack of claim 1, wherein growth orientation of the magnetic recording layer is based on the MgO—Ti(ON) layer.

4. The stack of claim 1, wherein a thickness of the MgO—Ti(ON) layer determines an amount of laser power applied to heat the stack.

5. The stack of claim 1, wherein the composition (x) of the $(MgO)_x(Ti_{0.5}(O_yN_{(1-y)})_{0.5})_{1-x}$ layer determines thermal conductivity of the stack.

6. The stack of claim 1, wherein the nitrogen content (1-y) of the $(MgO)_x(Ti_{0.5}(O_yN_{(1-y)})_{0.5})_{1-x}$ layer determines an amount of laser power applied to heat the stack.

7. The stack of claim 1, wherein the MgO—Ti(ON) layer has a thickness of 1 to 500 angstroms.

8. The stack of claim 1, wherein the MgO—Ti(ON) layer laterally conducts heat in the stack.

9. The stack of claim 1, wherein the MgO—Ti(ON) layer is a continuous layer.

10. A stack, comprising:
    a substrate;
    a magnetic recording layer;
    a heatsink layer disposed between the substrate and the magnetic recording layer; and
    a non-magnetic MgO—Ti(ON) layer disposed between the heatsink layer and the magnetic recording layer wherein the MgO—Ti(ON) layer comprises $(MgO)_x(Ti_{0.5}(O_yN_{(1-y)})_{0.5})_{1-x}$ and at most 20 vol. % MgO.

11. The stack of claim 10, wherein growth orientation of the magnetic recording layer is based on the MgO—Ti(ON) layer and the MgO—Ti(ON) layer laterally conducts heat in the stack.

12. A method, comprising:
    depositing MgO and TiO using a composite sputtering target, wherein the composite sputtering target comprises at most 25 vol. % MgO, in a nitrogen environment to form a non-magnetic MgO—Ti(ON) layer comprising $(MgO)_x(Ti_{0.5}(O_yN_{(1-y)})_{0.5})_{1-x}$ and at most 20 vol. % MgO on a substrate; and
    epitaxially growing an FePt magnetic recording layer on the non-magnetic MgO—Ti(ON) layer.

13. The method of claim 12, wherein the MgO—Ti(ON) layer is deposited using DC-sputtering.

14. The method of claim 12, further comprising forming a heatsink layer, wherein the MgO—Ti(ON) layer is a thermal resistor formed on the heatsink layer.

15. The method of claim 12, wherein the MgO—Ti(ON) layer is deposited in less than 10 seconds.

16. The method of claim 12, wherein the nitrogen environment includes 0.1-100% $N_2$.

* * * * *